(12) United States Patent
Detar

(10) Patent No.: US 11,613,374 B2
(45) Date of Patent: Mar. 28, 2023

(54) ENCASED EXHAUST

(71) Applicant: Stephen David Detar, Boston, MA (US)

(72) Inventor: Stephen David Detar, Boston, MA (US)

( * ) Notice: Subject to any disclaimer, the term of this patent is extended or adjusted under 35 U.S.C. 154(b) by 0 days.

(21) Appl. No.: 17/345,089

(22) Filed: Jun. 11, 2021

(65) Prior Publication Data

US 2022/0396366 A1 Dec. 15, 2022

(51) Int. Cl.
*B64D 33/04* (2006.01)
*F01N 1/12* (2006.01)
*F02K 7/08* (2006.01)
*B64C 39/02* (2006.01)
*F01N 13/18* (2010.01)

(52) U.S. Cl.
CPC ............ *B64D 33/04* (2013.01); *B64C 39/024* (2013.01); *F01N 1/12* (2013.01); *F01N 13/1833* (2013.01); *F02K 7/08* (2013.01)

(58) Field of Classification Search
CPC ... B64D 33/04; B64C 39/024; F01N 13/1833; F01N 1/089; F01N 1/12; F01N 2470/08; F01N 2470/18; F01N 2470/20; F01N 2490/16; F02K 7/08; F02K 1/817
See application file for complete search history.

(56) References Cited

U.S. PATENT DOCUMENTS

| | | | | |
|---|---|---|---|---|
| 6,062,176 | A | * | 5/2000 | Berger ................ F02B 75/34 123/54.2 |
| 2010/0050592 | A1 | * | 3/2010 | Lu .............. F02K 7/08 60/39.38 |
| 2013/0168183 | A1 | * | 7/2013 | Harris .............. F01N 1/24 181/256 |
| 2014/0312177 | A1 | * | 10/2014 | Gaonjur .......... B64C 27/26 244/7 A |
| 2020/0043456 | A1 | * | 2/2020 | Zhang .............. F01N 1/088 |
| 2022/0003189 | A1 | * | 1/2022 | Taylor ............. F01D 1/32 |
| 2022/0213789 | A1 | * | 7/2022 | McCormick ....... F01B 11/001 |

* cited by examiner

*Primary Examiner* — Michael C Zarroli

(57) ABSTRACT

The encased exhaust is a traditional aftermarket expansion chamber muffler system for a two stroke engine encompassing a duct fan/propeller. The propeller is mounted directly to the engine's driveshaft, eliminating reduction gears and belts allowing for more airflow and less weight. This eliminates the muffler and replaces the cage on a paramotor, allowing for more airflow through the funneled air duct. The configuration of these two functions exists in a particular sequence.

1 Claim, 2 Drawing Sheets

Fig. 3
Fig. 4
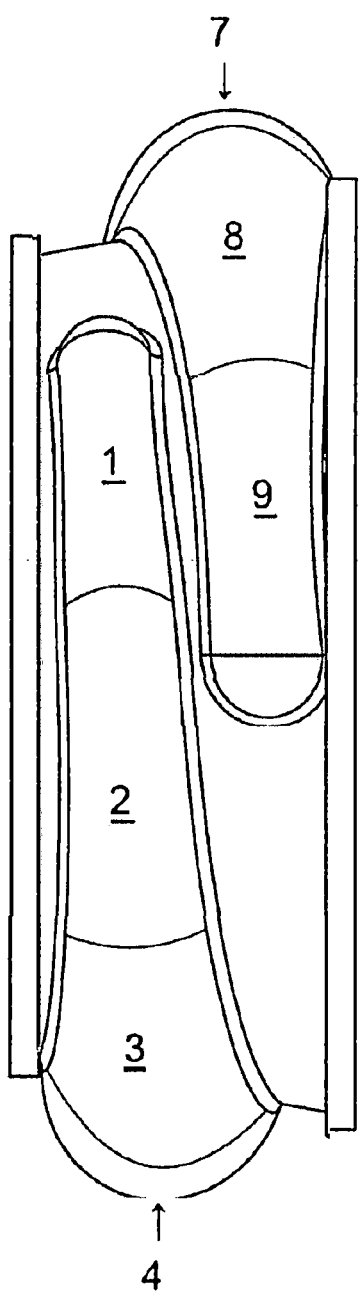
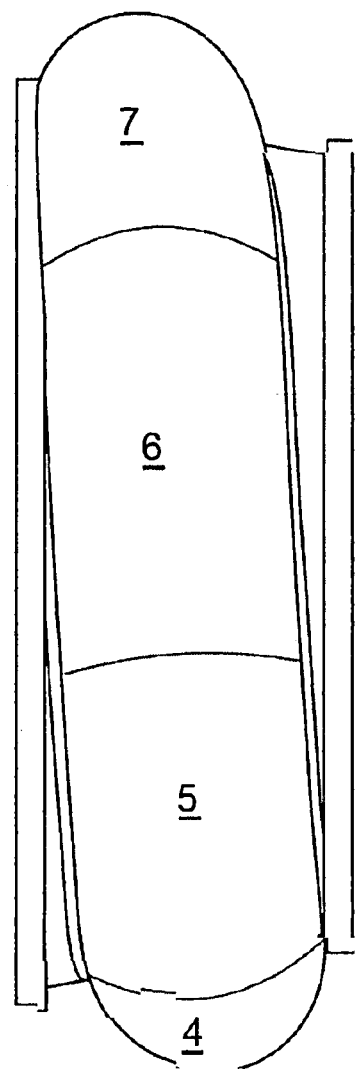

ENCASED EXHAUST

CROSS-REFERENCE TO RELATED APPLICATIONS

Not-Applicable

STATEMENT REGARDING FEDERALLY SPONSORED RESEARCH OR DEVELOPMENT

Not-Applicable

REFERENCE TO SEQUENCE LISTING, A TABLE, OR A COMPUTER PROGRAM LISTEN COMPACT DISC APPENDIX

Not-Applicable

BACKGROUND OF INVENTION

My father was a professor who had a hobby of building model airplanes, hand-carved gas propeller engines. I was always curious about flight as I watched flocks of birds and airplanes flying overhead. I wanted to fly. I grew up using two-stroke engines on motorcycles, mopeds, snowmobiles, etc. October of the year 2000, I had a dream one night and this idea came to me. I should design an exhaust system for a two-stroke engine that contains a ducted fan with a liner inside or the cylinder. It would funnel the exhaust into the ducting, eliminating the muffler from the system.

This would allow for more airflow from the fan which moves through the duct. I knew this would solve the problem of the traditional exhaust system which contains an exhaust muffler, blocking the airflow. I was able to develop the exhaust system by eliminating the exhaust muffler. I now have a prototype of a product that works with several markets available.

BRIEF SUMMARY OF THE INVENTION

This invention is an expansion chamber exhaust system that encompasses a duct. The duct consists of an inner and outer sleeve, creating an exhaust chamber. The expansion chamber goes around the ducting and bolts to the engine and fan (fan and engine not included in invention). The inner sleeve is an airflow duct. The exhaust chamber is between the inner and outer sleeves. There is an inlet and an outlet to the expansion chamber on the inner wall of the ducting, creating an exhaust for the engine.

BRIEF DESCRIPTION OF THE SEVERAL VIEWS OF THE DRAWING

FIG. 3 depicts the right side view of the Encased Exhaust

FIG. 4 shows the left side view of the Encased Exhaust

DETAILED DESCRIPTION OF THE INVENTION

Figure 1:
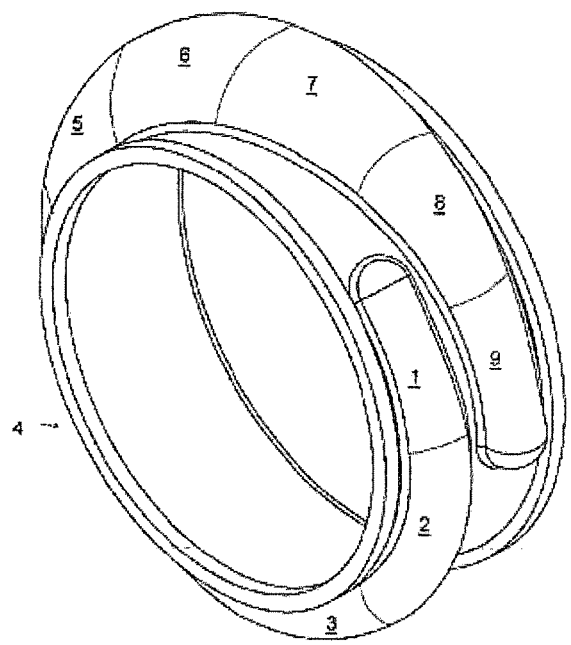
FIG. 1 depicts the 3D front view of the Encased Exhaust
Figure 2:
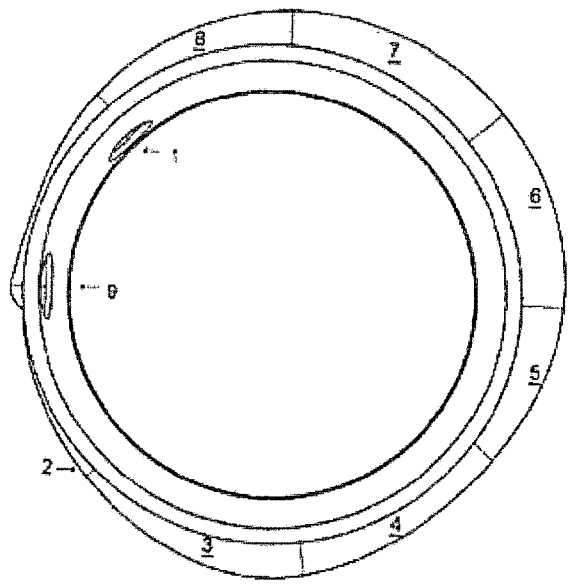
FIG. 2 shows the inlet section of the Encased Exhaust with two holes, one for the header and one for the outlet (exhaust inlet and exhaust outlet)

The expansion chamber stages consist of separate pieces of sheet metal formed in an arc shaped bend. These sheet metal sections are welded together at the inlet and outlet sides of the cylinder's ducting, and at the end and beginning of each stage. The inner liner/sleeve/ducting cylinder is welded to the outer sleeve/shell, creating a chamber. They all funnel air flow. The entire cylinder is the bottom of the expansion chamber stages. The width of the sheet metal changes according to the different number of the expansion chamber stages. The propeller is mounted directly to the engine's driveshaft, eliminating reduction gears and belts allowing for more airflow and less weight. The propeller's diameter determines the stages' combined radius. The engine's header connects to the divergent cone.

REFERENCE CHARACTERS

1: Header/Inlet
2: Divergent Cone Stage Diffuser (expands)
3: Divergent Cone Stage Diffuser (expands)
4: Divergent Cone Stage Diffuser (expands)
5: Belly
6: Belly
7: Convergent Cone (contracts)
8: Convergent Cone (contracts)
9: Stinger/Outlet

The invention claimed is:
1. An exhaust device to increase airflow through an engine thereby increasing engine power, comprising:
   a two stroke engine that contains a ducted fan liner and further including an encased expansion chamber exhaust ring;
   the encased expansion chamber exhaust ring provides airflow through a funneled exhaust airduct of the ducted fan liner;
   the encased expansion chamber exhaust ring is assembled around the ducted fan liner and is configured to funnel exhaust from the engine into the exhaust airduct;
   the encased expansion chamber exhaust ring is manufactured of sheet metal formed in a circle, the width of the sheet metal varies according to the different number of the expansion chamber stages;
   the inner side of the encased expansion chamber exhaust ring contains an inlet and outlet and is welded to the respective inlet and outlet ducted fan liner cylinder;
   the end and beginning of each expansion chamber stage contains either a divergent or convergent diffuser cone arrangement, with the engine header connected to a divergent cone.

* * * * *